United States Patent [19]

Hazen et al.

[11] 3,872,209
[45] Mar. 18, 1975

[54] ION EXCHANGE PROCESS FOR THE RECOVERY OF METALS

[75] Inventors: Wayne C. Hazen, Denver; Enzo L. Coltrinari, Arvada, both of Colo.

[73] Assignee: Hazen Research, Inc., Golden, Colo.

[22] Filed: Mar. 17, 1972

[21] Appl. No.: 235,623

[52] U.S. Cl................. 423/24, 75/101 BE, 75/117
[51] Int. Cl.............................................. C01g 3/00
[58] Field of Search .......... 423/24; 75/101 BE, 117; 260/566 A

[56] References Cited
UNITED STATES PATENTS 2,992,894  7/1961  Hazen et al........................... 423/24
3,592,775  7/1971  Swanson .............................. 260/566

Primary Examiner—M. Weissman
Attorney, Agent, or Firm—Sheridan, Ross & Fields

[57] ABSTRACT

A process for recovering copper values from an acidic aqueous medium which comprises contacting the medium with a mixed extraction reagent. The reagent comprises an organic solvent having dissolved therein a 2-hydroxy benzophenoxime or mixtures thereof and an organo phosphoric acid in an amount up to about 4 percent by volume of the solvent. The invention includes the composition comprised of the substituted hydroxy benzophenoxime and the organophosphoric acid.

13 Claims, 7 Drawing Figures

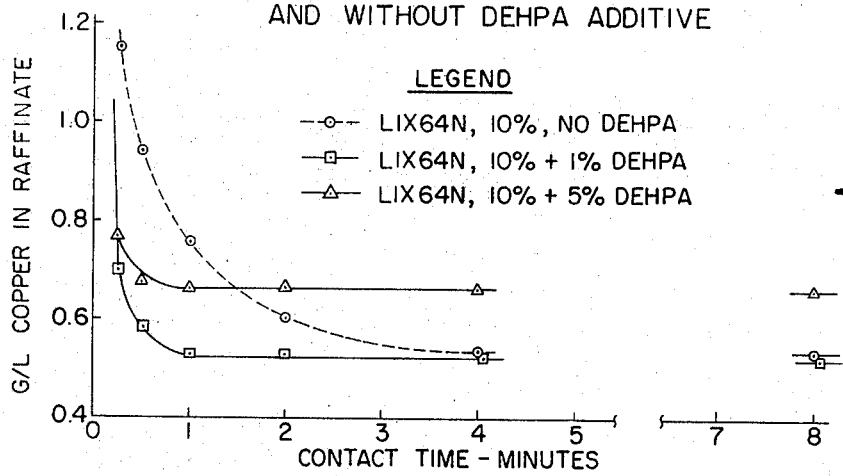
FIG. 2 — LOADING RATES OF LIX64N WITH AND WITHOUT DEHPA ADDITIVE
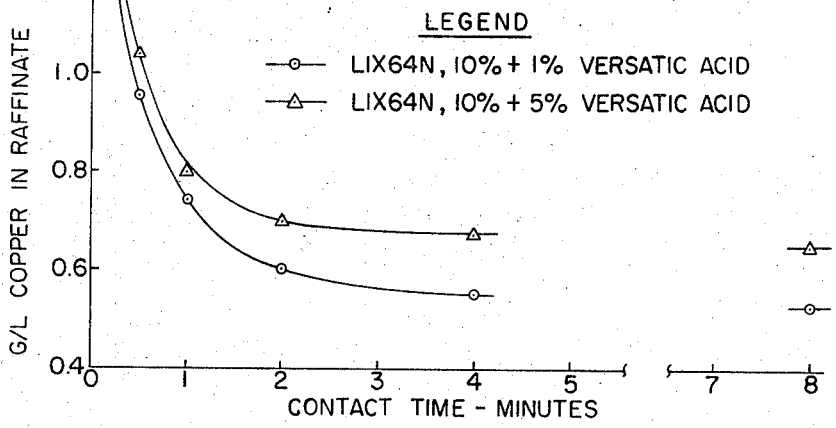
FIG. 4 — EFFECT OF AND VERSATIC ACID ADDITION TO LIX64N ON COPPER EXTRACTION RATE
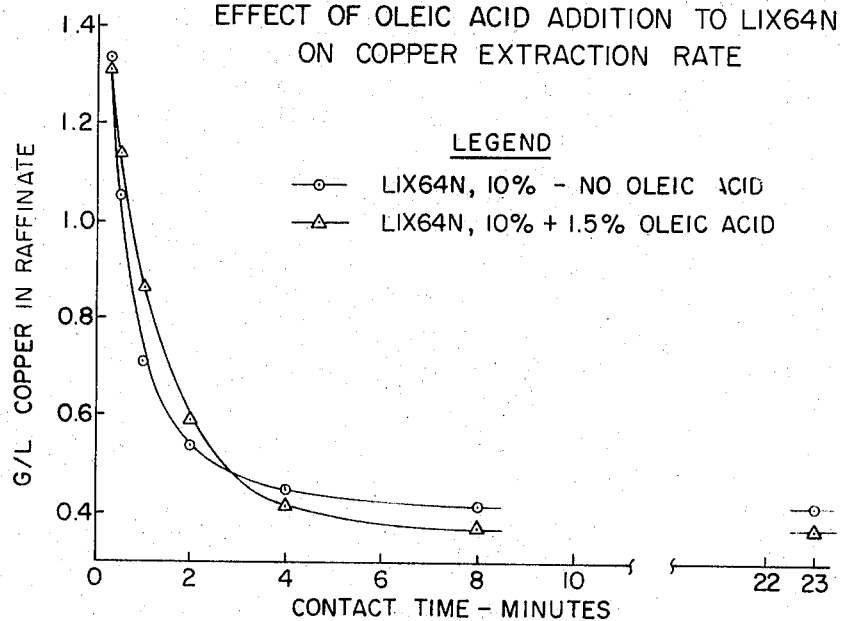
FIG. 5 — EFFECT OF OLEIC ACID ADDITION TO LIX64N ON COPPER EXTRACTION RATE

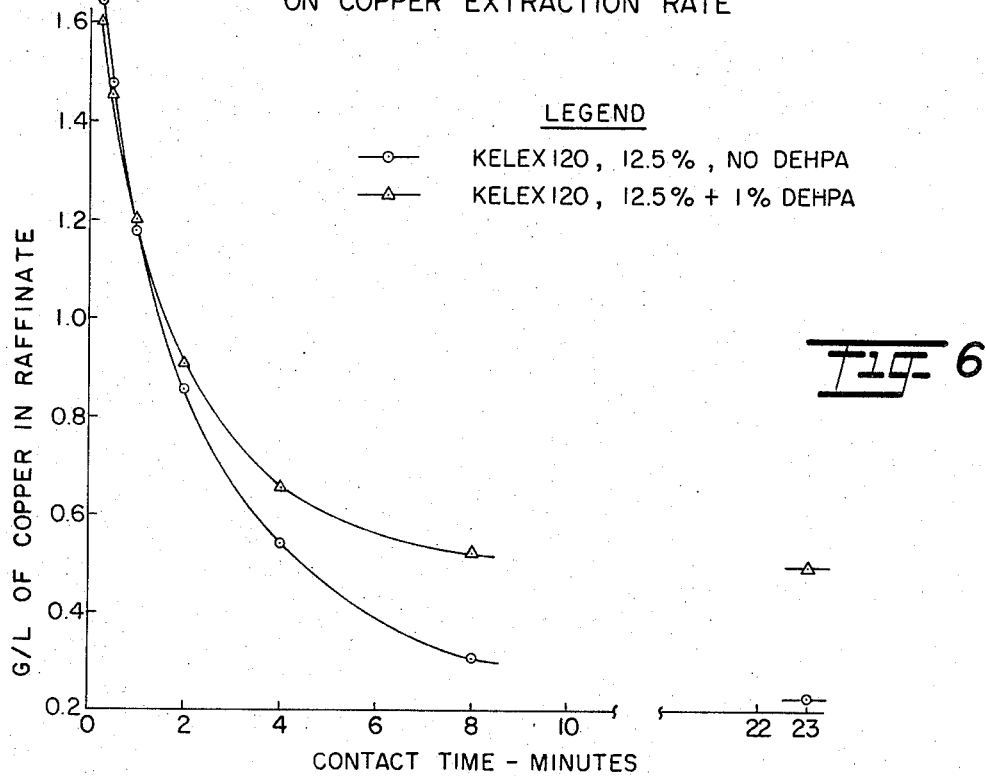
Fig. 6 EFFECT OF DEHPA ADDITION TO KELEX 120 ON COPPER EXTRACTION RATE
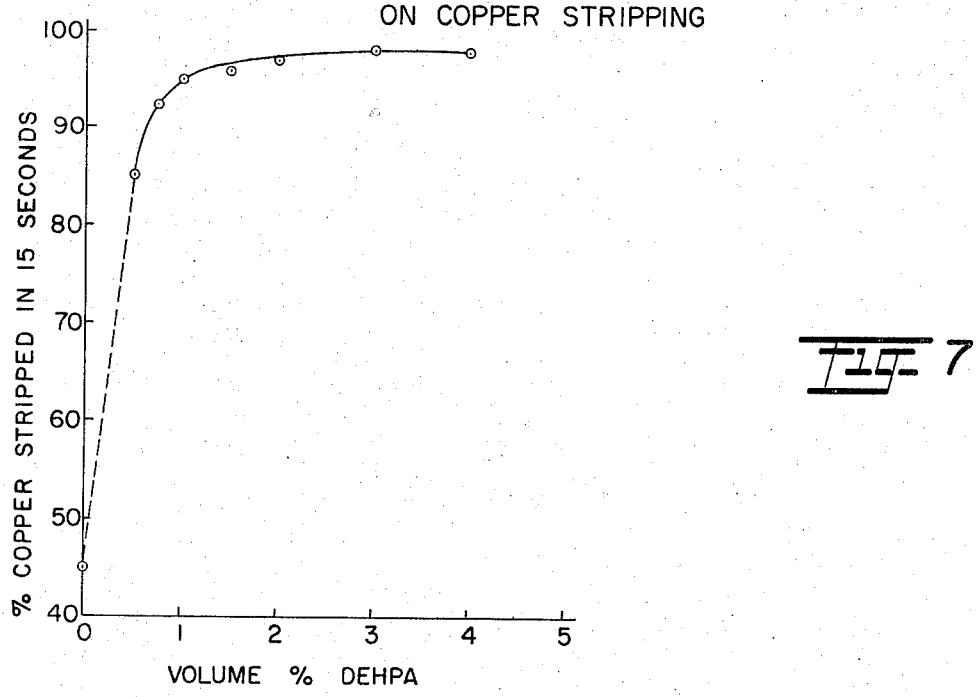
Fig. 7 EFFECT OF DEHPA CONCENTRATION IN LIX64N ON COPPER STRIPPING

ION EXCHANGE PROCESS FOR THE RECOVERY OF METALS

BACKGROUND OF THE INVENTION

The solvent extraction process is finding increasing application in the field of extractive metallurgy. It is commercially used for the recovery of uranium, copper, tungsten, molybdenum, rare earths, beryllium, and other metals. Its wide application is because of the availability of organic solvents with specifically selective properties for a given element. The specific organic solvent can be used to extract from an aqueous solution and purify one metal element from a mixture containing many contaminants.

The most recent wide use of solvent extraction is for the recovery of copper from dilute sulfuric acid solutions such as those obtained by leaching a copper oxide ore. This use has been made possible principally by the development of specifically copper selective solvents such as the extractants sold by Ashland Chemical Co. under the trade name Kelex, and those sold by General Mills Co. under the trade names LIX-63, LIX-64, LIX-64N and LIX-70, the latter three including substituted 2-hydroxy benzophenoximes as the active extractant.

The copper selective solvent sold under the trade name LIX-63, an alpha hydroxy oxime, is not operative in solutions of the acidity normally encountered in acid leaching while certain other types such as the sulfonates and organo phosphates are non-selective and thus have no present use in copper recovery.

The equipment for the application of solvent extraction to extractive metallurgy has usually consisted of multiple stage countercurrent mixer-settler systems in which the barren organic solvent and the pregnant aqueous stream (usually a leach liquor) are mixed together for a given period of time after which they are permitted to separate in a settling reservoir. The solvent and aqueous then flow in opposite directions to the next stage of contact.

During the mixing step in conventional systems for copper recovery, the driving force for the transfer of the copper from the aqueous to the organic phase (or in the case of stripping, the transfer from the organic to the aqueous phase) depends upon the difference in concentration of copper in the aqueous and the organic phases. If agitated long enough, eventually a chemical equilibrium is achieved and no further transfer of copper takes place between the aqueous and the organic. The concentrations at which equilibrium is reached will be dependent on the organic solvent, the acidity of the solution, temperature, etc. In order to achieve maximum efficiency in the system, it is highly desirable to have each mixer come as close as possible to this chemical equilibrium before the material leaves the mixer and flows to the settling tanks.

The size of the mixing equipment which is required to achieve chemical equilibrium within a given time will depend fundamentally on the extraction rate of the particular organic solvent being used. It is known that those solvents which have been developed specifically for the extraction of copper are much slower in their extraction rate than are the solvents used specifically for extraction of some other metals, as for example, uranium. The extraction of uranium with a tertiary amine in acid solution of pH 1.5 is very fast, a matter of seconds, whereas the extraction of copper from acid solution of that pH by LIX-64N, (a substituted benzophenoxime) is quite slow, commonly requiring as long as four minutes to reach equilibrium in a batch agitated system at room temperature. Because the solution flow rates in a copper leaching plant are very large, the size of the mechanically agitated vessels required for a mixing system to contain and mix the required solvent and aqueous for this long a time are large and expensive. In addition, in a continuous mixing system it is not possible to achieve the true chemical equilibrium that is achieved when materials are agitated in a batch. This is because of the well known phenomenon of short circuiting. In fact, as a practical matter, a mixer designed for copper extraction is calculated on the basis of only 80 percent of the extraction equilibrium that would be achieved in a batch tank having the same residence time.

The dollar value per unit volume of a copper leach solution containing a few grams per liter of copper is very low, thus the capital investment for an appropriate mixing system is quite high for the amount of copper which is being treated. The depreciation costs, therefore, per pound of copper are high and to that extent it diminishes the value of the solvent extraction process for the copper industry.

Much of this disadvantage would be overcome if it were possible to accelerate the rate of transfer of copper from an aqueous leach liquor to the solvent and its reverse, the stripping of copper from solvent into an acid electrolyte. This objective is achieved through the present invention through which the rate of extraction of copper from an acid solution by the specified copper extractants, LIX-64, LIX-64N and LIX-70, is enormously accelerated by the addition of small quantities of organic phosphoric acids.

SUMMARY OF THE INVENTION

The invention relates to the use of organophosphoric acids as additives to the 2-hydroxy benzophenoximes represented by the trade name products LIX-64, LIX-64N and LIX-70 sold by General Mills, Inc., to greatly increase the rate at which these products are loaded with copper when used as ion exchange extractants to recover copper from acid solution. It comprises a method for recovering copper values from acidic aqueous solutions by contacting the solution with a water-immiscible organic phase comprised of an organic solvent having disclosed therein as an active extractant a 2-hydroxy benzophenoxime or mixtures thereof and an organophosphoric acid in an amount up to about 40 percent by volume of the organic solvent. The invention includes the composition comprised of the 2-hydroxy benzophenoxime and the organophosphoric acid.

DETAILED DESCRIPTION OF THE INVENTION

Two-hydroxy benzophenoximes operative for the invention include those disclosed in U.S. Pat. No. 3,428,449 issued to Ronald R. Swanson on Feb. 18, 1969. These compounds are ion exchange extractants for copper values in acid solutions. Individual compounds or mixtures thereof may be used. Methods for making these compounds are disclosed in the same patent. As disclosed in the above patent, 2-hydroxy benzophenoximes having the basic structure,

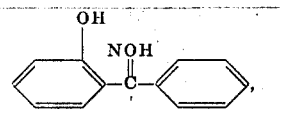

are tailored with substituents to provide the required solubility in suitable organic solvents, the extractants including 2-hydroxy benzophenoximes in which the substituents are alkyl radicals, ethylenically unsaturated aliphatic radicals and alkyl or ethylenically unsaturated aliphatic ether radicals.

The preferred 2-hydroxy benzophenoximes are those represented by the formula:

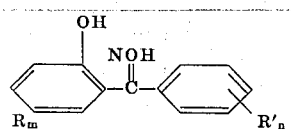

in which R and R' may be individually alike or different and are saturated aliphatic groups, ethylenically unsaturated aliphatic groups or saturated or ethylenically unsaturated ether groups (i.e. —OR") and $m$ and $n$ are 0, 1, 2, 3 or 4 with the proviso that $m$ and $n$ are not both 0. The total number of carbon atoms is $R_m$ and $R'_n$ is from 3–25. R and R' contain 1 to 25 carbon atoms when saturated aliphatic and 3 to 25 carbon atoms when they are ethylenically unsaturated groups. Preferably, the position ortho to the phenolic OH substituted carbon atom is unsubstituted and also preferably the positions ortho to the oxime carbon atom on the other aromatic nucleus are unsubstituted. Branched chain saturated aliphatic hydrocarbon substituents are preferred. Compounds of the above type useful in the present invention include the following:

2-hydroxy-3'-methyl-5-ethylbenzophenoxime
2-hydroxy-5-(1,1-dimethylpropyl)-benzophenoxime
2-hydroxy-5-(1,1-dimethylethyl)-benzophenoxime
2-hydroxy-5-octylbenzophenoxime
2-hydroxy-5-nonyl-benzophenoxime
2-hydroxy-5-dodecyl-benzophenoxime
2-hydroxy-2',4'-dimethyl-5-octylbenzophenoxime
2-hydroxy-2',3',5'-trimethyl-5-octylbenzophenoxime
2-hydroxy-3,5-dinonylbenzophenoxime
2-hydroxy-4'-(1,1-dimethylethyl)-5-(2-pentyl)-benzophenoxime
2-hydroxy-4'-(1,1-dimethylethyl)-5-(2-butyl)-benzophenoxime
2-hydroxy-4-dodecyloxybenzophenoxime
2-hydroxy-4'-(1,1-dimethylethyl)-5-methyl-benzophenoxime
2-hydroxy-4',5-bis-(1,1-dimethylethyl) benzophenoxime As indicated from the above representative compounds, various alkyl groups can be used as R and R'. And as set forth above, such groups may be branched or straight chain. Various ethylenically unsaturated groups can also be used as R and R' and the same may be branched or straight chain. Representative of such groups are pentenyl, hexenyl, octenyl, decenyl, dodecenyl, octadecenyl and the like. It is preferred that such groups contain less than about 2 double bonds and more preferably a single double bond. The R" portion of the ether groups can be the saturated and ethylenically unsaturated aliphatic groups as described. The R" portion of the said ether groups is preferably an alkyl group. In addition, the saturated, ethylenically unsaturated and ether groups may contain inert substituents such as halogen, ester, amide, and the like. Likewise, the aromatic nuclei can contain inert substituents. By inert is meant that the said constituents do not affect the solubility, stability or extraction efficiency of the compounds to any significant extent.

The benzophenoximes, which may be used in the present invention, are those which have sufficient solubility in one or more of the above solvents or mixtures thereof to make about a 2% solution and which are essentially insoluble or immiscible with water. At the same time, the benzophenoxime should form a complex with the metal, such as copper, which complex, likewise, is soluble in the organic solvent to at least the extent of about 2% by weight. These characteristics are achieved by having alkyl, ethylenically unsaturated aliphatic or ether substituents as described on either ring. It is necessary to have substituents which total at least 3 carbon atoms. This minimum may be obtained by means of a total of 3 methyl groups distributed on either one or on the two rings, by means of a methyl and an ethyl group, by means of a propyl group, etc. Usually it is preferred not to have more than 25 carbon atoms total in the substituents since these substituents contribute to the molecular weight of the oxime without improving operability. Large substituents, therefore, increase the amount of oxime for a given copper loading capacity. In general, the branched chain alkyl substituents effect a greater degree of solubility of the reagent and of the copper complex and, accordingly, these are preferred.

The above compounds are suitable as the copper ion exchange extractant component of the mixed solvent extraction agent of the present invention which includes as the other component an organophosphoric acid in addition to the solvent.

The organophosphoric acids used as additives to the 2-hydroxy benzophenoximes as represented by the formula:

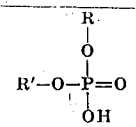

wherein R and R' may be hydrogen, aliphatic, aryl, aralkyl and wherein not more than one R is hydrogen. The term aliphatic includes branched chain radicals and alkyl or aryl substituted radicals. The term aryl includes alkyl substituted aryl radicals.

The organophosphoric acids which can be used include di(2-ethylhexyl) phosphoric acid, octyl phosphoric acid, dodecyl phosphoric acid, amyl phosphoric acid, isoamyl phosphoric acid, heptadecylphosphoric acid, di(1-methylheptyl) phosphoric acid, di-isooctyl-phosphoric acid, di(2-ethyl-4-methylpentyl) phosphoric acid, di(2-propyl-4-methyl-pentyl) phosphoric acid, octylphenyl phosphoric acid, di-phenyl phosphoric acid, the isooctyl or stearyl derivatives of alkyl acid phosphates and others. Of course, these compounds can be used in the form of their phosphates.

It has been found that the tri-substituted organophosphoric acids, such as, triphenyl phosphate are inoperative for the purpose of the invention.

The organophosphoric acids are used in amounts with the substituted 2-hydroxy benzophenoximes up to about 4 percent by volume of the organic solvent. Above this amount no further acceleration in rate is found and in fact a decrease in total leading capacity occurs. Up to 20% by volume of LIX-64N and LIX-70 may be used. In addition to increasing the loading rate of the hydroxy benzophenoximes it was found that the presence of the organophosphoric acids in the amounts stated also increases the rate at which metals can be stripped with acid from the 2-hydroxy benzophenoxime extractant.

It was found that use of other cation exchange materials as additives to the 2-hydroxy benzophenoximes, such as, versatic acid, oleic acid and naphthenic acid, had little effect on the loading rate. Also, the use of the organophosphoric additives with other conventional copper extractants, such as Kelex-120, an alkylated hydroxy quinoline, has no noticeable effect on the loading rate of copper.

The water-immiscible organic solvents in which the extractant mixture is dissolved to form the organic phase are the conventional ones, such as, aliphatic hydrocarbon solvents including petroleum derived liquid hydrocarbons, either straight chain or branched, such as, kerosene, fuel oil, etc. Various aromatic solvents or chlorinated aliphatic solvents may be used, such as benzene, toluene, xylene, carbon tetrachloride, perchloroethylene and others. The solvent must be substantially water-immiscible, capable of dissolving the extraction reagent, and must not interfere with the function of the reagent in extracting the metal values from acid solution. The benzophenoxime component of the organic extractant mixture must have a solubility of at least 2 percent by weight in the hydrocarbon solvent in the organic phase and is insoluble in water.

The aqueous phase from which the desired metal is extracted is ordinarily the acidic leach solution resulting from leaching of an ore. During the extraction phase the mixed extractant becomes loaded with copper or other desired metal.

It is well known that LIX-64, LIX-64N and LIX-70 exhibit a selectivity for copper over other metals at pH values below about 4. The most efficient organic to aqueous ratio can be arrived at in accordance with procedures well known in the art. After separation of the loaded organic phase from the aqueous phase copper is stripped from it with a mineral acid, such as sulfuric, in a stripping circuit.

The liquid-liquid extraction may be performed by continuous countercurrent or batch methods.

The extraction with the extractant mixture is performed at a pH in the acid range. Leach solutions of copper ores ordinarily have a pH range from about 1.7 - 3.0.

The invention is illustrated by the following examples and the graphs of FIGS. 1–7 illustrating the results of various types of examples including comparative examples and stripping examples.

In the examples on which the graphs are based, except those for FIGS. 3 and 7, sulfate solution was used for the aqueous containing 2.0 g/l Cu + 10 g/l $Na_2SO_4$ at pH 2. For the examples of FIG. 3 the composition of the sulfate solution was 1.9 g/l Cu, 0.9 g/l $Fe^{+3}$, 10 g/l $Na_2SO_4$. The solvent for all examples was kerosene (SACO SOL 175). An organic to aqueous ratio of 1/1 was used at temperatures of 25°C and 23°C with the exception of the example of FIG. 7 in which an O/A ratio of 2/1 was used. In all the graphs except FIG. 7 contact time in minutes is plotted on the abscissa against g/l of Cu in the raffinate on the ordinate. All percentages are in volume percentages.

The graph of FIG. 7 is based on examples of stripping LIX-64N loaded with copper when varying amounts of DEHPA were added to the LIX-64N. 3N $H_2SO_4$ was used for stripping. The organic was loaded to 1.2–1.4 g/l copper.

The examples presented in Table 1 were performed to show the increase in the rate of extraction of copper from an acidic copper sulfate liquor with LIX-64N as the extractant to which was added varying quantities of di-2-ethyl hexyl phosphoric acid (DEHPA). For these tests, a given amount of the copper solution analyzing 1.98 g/l Cu, 1 g/l Fe, 10 g/l $Na_2SO_4$ at pH 2.0 was mixed with an equal volume of solvent for the time noted. The phases were then separated and the amount of copper extracted was determined by analysis. The solvent in all of the examples contained 10 volume % of LIX-64N in kerosene (AMSCO 175) to which was added varying quantities of di-2-ethyl hexyl phosphoric acid as specified in volume percent.

TABLE 1

| | | % of COPPER EXTRACTED | | | | |
|---|---|---|---|---|---|---|
| Test No. | Mixing Time Minutes | NO DEHPA | .5% DEHPA | 1% DEHPA | 2% DEHPA | 4% DEHPA |
| 1 | .25 | 32% | 62% | 65% | 65% | 58% |
| 2 | .50 | 47 | 69 | 73 | 72 | 62 |
| 3 | 1 | 58 | 77 | 73 | 73 | 63 |
| 4 | 4 | 77 | 77 | 73 | 73 | 61 |

From the above results it can be seen that the addition of an amount of DEHPA equal to 1% increased the extraction rate so much that 15 seconds of mixing extracted more copper than a minute of agitation without the DEHPA. This means that a solvent extraction mixing system would only need to be one quarter as large if the DEHPA is added to the LIX-64N. It will also be noted from these examples that adding more than an amount of about 4 volume percent of di-2-ethyl hexyl phosphate impairs the loading capacity of the LIX-64N.

The examples presented in the following tables illustrate that the rate of transfer of copper from one phase to another is accelerated not only in the extraction but in the stripping operation also. For all examples in Table 2 a 10% by volume LIX-64N solution in kerosene containing various percentages of DEHPA was loaded with copper by agitating with an acidic copper sulfate solution. Portions of the loaded solvents were agitated for 15 seconds with 3 Normal sulfuric acid at an organic to aqueous ratio of 2 to 1 at room temperature. The percentage of the copper stripped was determined by analysis of the separated phases.

TABLE 2

| Test No. | DEHPA VOL % | g/l Cu LOADED ORGANIC | g/l Cu STRIPPED ORGANIC | % Cu Stripped in 15 Seconds |
|---|---|---|---|---|
| 1 | 0 | 1.43 | 0.94 | 34 |
| 2 | 0.50 | 1.40 | 0.23 | 84 |
| 3 | 1.0 | 1.33 | 0.11 | 92 |
| 4 | 2.0 | 1.30 | 0.082 | 94 |
| 5 | 4.0 | 1.10 | 0.027 | 98 |

It can be seen from the above table that stripping is essentially complete in 15 seconds from a loaded solvent which contains the proper quantity of DEHPA where it is incomplete if the additive is absent. This clearly demonstrates the acceleration of stripping rate when the solvent contains DEHPA.

The beneficial result from the addition of an organic phosphoric acid is found not only with LIX-64N but also for LIX-70. In the example presented in the following table, the extraction rates are compared for LIX-70 with and without di-2-ethyl hexyl phosphoric acid additive.

For these tests, a given amount of copper solution analyzing 1.9 g/l Cu, 0.83 g/l Fe, 10 g/l Na$_2$SO$_4$ was mixed at pH 2.0 with an equal volume of solvent for the time noted. After separation of the phases the amount of copper extracted was determined by analysis. The solvent for all examples contained 7.5 volume % LIX-70 in kerosene to which was added 1.0 volume % of DEHPA. An organic to aqueous ratio of 1:1 was used at a temperature of 25°C.

TABLE 3

| Test No. | DEHPA Vol. % | CONTACT TIME MINUTES | G/L Cu RAFFINATE | G/L Cu ORGANIC |
|---|---|---|---|---|
| 1 | 0 | 0.25 | 1.18 | 0.85 |
| 2 |  | 0.5 | .84 | 1.16 |
| 3 |  | 1 | .54 | 1.45 |
| 4 |  | 2 | .26 | 1.74 |
| 5 |  | 4 | .16 | 1.84 |
| 6 | 1.0 | 0.25 | 0.48 | 1.52 |
| 7 |  | 0.5 | .24 | 1.76 |
| 8 |  | 1 | .14 | 1.86 |
| 9 |  | 2 | .14 | 1.86 |
| 10 |  | 4 | .16 | 1.84 |

The results of Table 3 show that DEHPA is an effective for accelerating the loading of LIX-70 with copper as it is for LIX-64N.

The following table presents results showing the effectiveness of DEHPA on the stripping of copper from LIX-70.

TABLE 4

For the following stripping examples, 7.5 volume percent of LIX-70 in kerosene with and without DEHPA was loaded with copper by contacting with simulated copper leach liquor. The loaded extractants were stripped with 3N H$_2$SO$_4$. Stripping contact time in each example was 15 seconds.

| Test No. | DEHPA VOL.% | G/L Cu LOADED ORGANIC | G/L Cu STRIPPED ORGANIC | % Cu Stripped In 15 Seconds |
|---|---|---|---|---|
| 1 | 0 | 1.53 | 1.70 | 7.1 |
| 2 | 1.0 | 1.76 | 1.26 | 28 |

The results of Table 4 show that DEHPA greatly improves the stripping rate of LIX-70.

The examples in the following Table 5 show copper loading by LIX-64 at various volume percentages of DEHPA and LIX-64N. The aqueous for the examples contained from 1.50 to 6.20 g/l Cu and 2 g/l of sodium sulfate. The solvent was kerosene and an O/A ratio of 1.2/1 was used.

TABLE 5

COPPER LOADING BY LIX-64N AT VARIOUS PERCENTAGES OF DEHPA AND LIX-64N

| TEST NO. | VOL % LIX-64N | VOL % DEHPA | CONTACT TIME, MINS | g/l Cu RAFFINATE | g/l Cu ORGANIC | % OF MAXIMUM Cu LOADING |
|---|---|---|---|---|---|---|
| 1 | 5.0 | NONE | .25 | 1.22 | .23 | 28 |
| 2 |  |  | .5 | 1.12 | .32 | 36 |
| 3 |  |  | 1 | .97 | .44 | 53 |
| 4 |  |  | 2 | .80 | .58 | 70 |
| 5 |  |  | 4 | .62 | .73 | 88 |
| 6 |  |  | 8 | .50 | .83 | 100 |
| 7 | 5.0 | 0.25 | .25 | .59 | .76 | 86 |
| 8 |  |  | .5 | .49 | .84 | 95 |
| 9 |  |  | 1 | .45 | .88 | 100 |
| 10 |  |  | 2 | do. | do. | do. |
| 11 |  |  | 4 | do. | do. | do. |
| 12 |  |  | 8 | do. | do. | do. |
| 13 | 5.0 | 0.5 | .25 | .52 | .82 | 94 |
| 14 |  |  | .5 | .48 | .85 | 98 |
| 15 |  |  | 1 | .46 | .87 | 100 |
| 16 |  |  | 2 | do. | do. | do. |
| 17 |  |  | 4 | do. | do. | do. |
| 18 |  |  | 8 | do. | do. | do. |
| 19 | 5.0 | 3.0 | .25 | .60 | .75 | 97 |
| 20 |  |  | .5 | .59 | .76 | 99 |
| 21 |  |  | 1 | .58 | .77 | 100 |
| 22 |  |  | 2 | do. | do. | do. |
| 23 |  |  | 4 | do. | do. | do. |
| 24 |  |  | 8 | .59 | .76 | 99 |
| 25 | 30 | NONE | .25 | 3.60 | 2.17 | 54 |
| 26 |  |  | .5 | 3.22 | 2.48 | 62 |
| 27 |  |  | 1 | 2.68 | 2.93 | 73 |

TABLE 5 -Continued

COPPER LOADING BY LIX-64N AT VARIOUS PERCENTAGES OF DEHPA AND LIX-64N

| TEST NO. | VOL. % LIX-64N | VOL. % DEHPA | CONTACT TIME, MINS | g/l Cu RAFFINATE | g/l Cu ORGANIC | % OF MAXIMUM Cu LOADING |
|---|---|---|---|---|---|---|
| 28 | | | 2 | 2.04 | 3.47 | 87 |
| 29 | | | 4 | 1.60 | 3.83 | 96 |
| 30 | | | 8 | 1.41 | 3.99 | 100 |
| 31 | 30 | 1.5 | .25 | 1.88 | 3.60 | 91 |
| 32 | | | .5 | 1.66 | 3.78 | 95 |
| 33 | | | 1 | 1.46 | 3.95 | 99 |
| 34 | | | 2 | 1.44 | 3.97 | 100 |
| 35 | | | 4 | do. | do. | do. |
| 36 | | | 8 | do. | do. | do. |
| 37 | 30 | 3.0 | .25 | 1.83 | 3.64 | 94 |
| 38 | | | .5 | 1.65 | 3.79 | 98 |
| 39 | | | 1 | 1.56 | 3.87 | 100 |
| 40 | | | 2 | do. | do. | do. |
| 41 | | | 4 | do. | do. | do. |
| 42 | | | 8 | do. | do. | do. |
| 43 | 30 | 18 | .25 | 2.50 | 3.08 | 98 |
| 44 | | | .5 | 2.48 | 3.10 | 99 |
| 45 | | | 1 | 2.46 | 3.12 | 100 |
| 46 | | | 2 | 2.44 | 3.13 | do. |
| 47 | | | 4 | 2.44 | do. | do. |
| 48 | | | 8 | 2.46 | 3.12 | do. |

The results of Table 5 show that DEHPA additive is highly effective on the loading on LIX-64N at various percentages. The results of Tables 1 and 5 demonstrate that at about 4% by volume and above of DEHPA the loading capacity of LIX-64N is seriously impaired.

They further show that comparatively small percentages of DEHPA are highly effective in accelerating loading rate. Amounts as small as .25% by volume are shown to be effective.

The operable ranges are up to about 4% DEHPA by volume of the solvent and up to about 20% of LIX-64N by volume of the solvent.

The beneficial effect of the organic phosphoric acid is found with both the mono- and di-substituted esters of phosphoric acid, but is not evident with the neutral tri-substituted product. In the following Table 6, the rates of extraction of LIX-64N alone and with variously substituted organic phosphate ester additives are compared.

For the examples in the table, the aqueous contained 2.0 g/l Cu, 1.0 g/l Fe and 10 g/l $Na_2SO_4$ at a pH of 2.0. The organic was 10 volume % of LIX-64N in kerosene to which was added 1.0 volume % of phosphate. A contact time of 15 seconds was used and an O/A ratio of 1/1.

TABLE 6

| Test No. | PHOSPHATE ADDITIVE | g/l Cu ORGANIC | g/l Cu RAFFINATE |
|---|---|---|---|
| 1 | NONE | .37 | 1.62 |
| 2 | Di-2-ethyl-hexyl phosphoric acid | 1.36 | .70 |
| 3 | Didecyl phosphoric acid | 1.43 | .63 |
| 4 | Tridecyl phosphoric acid | 1.39 | .72 |
| 5 | Isoamyl phosphoric acid | 1.44 | .55 |
| 6 | Mono amyl phosphoric acid | 1.44 | .54 |
| 7 | Diamyl amyl phosphate | .32 | 1.63 |
| 8 | Triphenyl phosphoric acid | .32 | 1.69 |

The results of Table 6 show that the tri-substituted organophosphoric acids of tests 7 and 8 are inoperative as loading accelerating additives for LIX-64N while the mono- and di-substituted additives are highly effective.

Referring to FIG. 1, the loading rates of copper to equilibrium (approximate) are shown for LIX-64, LIX-64N, LIX-70 and Kelex 120. For the LIX composition without additive it takes at least four minutes to equilibrium and longer for Kelex 120.

FIG. 2 is a comparative graph of the loading rates for copper to equilibrium of LIX-64N at two concentrations of DEPHA against LIX-64N without DEHPA, the latter being represented by the dotted line. LIX-64N alone requires four minutes for loading while with the additive only one minute is required or one-fourth of the time.

FIG. 4 illustrates that versatic acid additive to LIX-64N gives no better loading times for copper than LIX-64N alone, i.e., four minutes are required to equilibrium.

FIG. 5 illustrates results showing that oleic acid as an additive has no effect in accelerating the loading of LIX-64N with copper.

FIG. 6 illustrates results showing that addition of DEHPA to Kelex 120 has no effect on accelerating copper loading of Kelex 120.

FIG. 7 illustrates results showing that DEPHA addition to LIX-64N rapidly accelerates the stripping of copper loaded on the mixed extractant. Above 90% of the copper is stripped in a period of 15 seconds.

Figure 1:
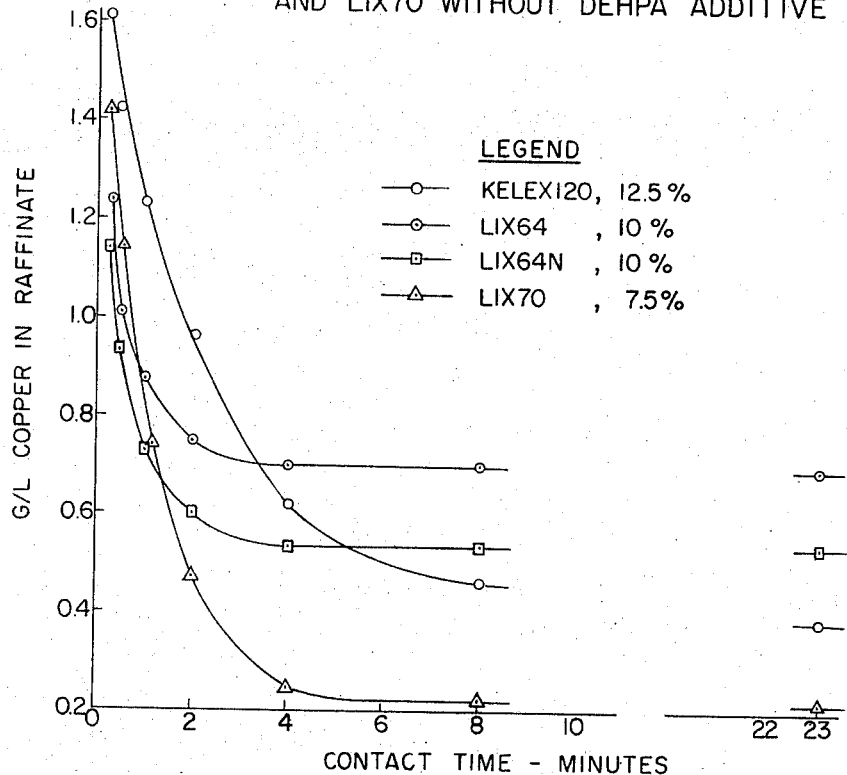
Figure 3:
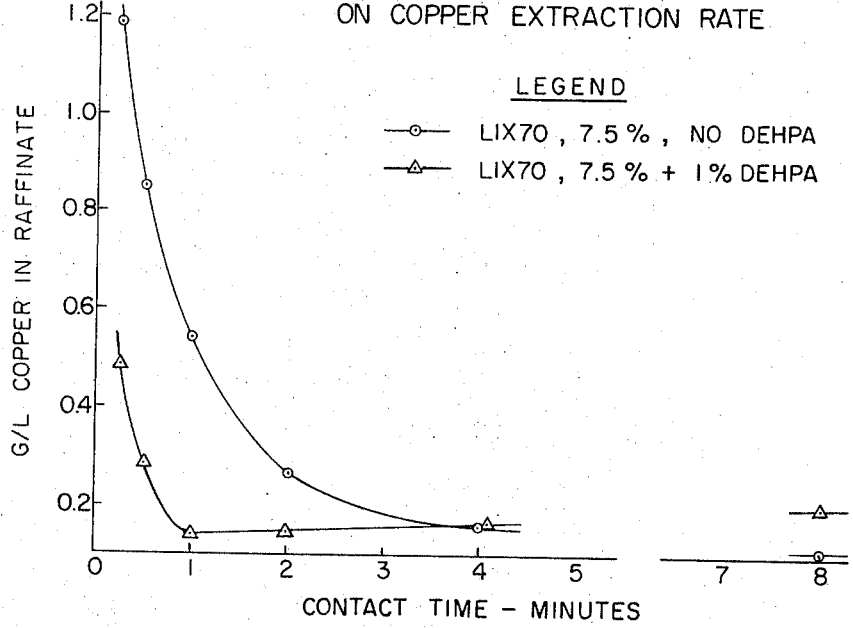
FIG. 3 shows that approximately the same results are obtained for LIX-70 as were obtained for LIX-64N as shown in FIG. 2.

The results set forth in the examples and graphs illustrate the effectiveness of the organophosphoric acid additives to LIX-64N and LIX-70 extractants for accelerating the loading rates for copper of the extractants. The loading rates are improved by a factor of four. They illustrate that the additives are equally effective on stripping rates. Commercial feasibility and significant economic advantage of the mixed extractants are demonstrated.

What is claimed is:

1. A process for the recovery of copper values from an aqueous medium comprising contacting said aqueous medium for a time up to about one minute with a mixed extraction reagent, the mixed extraction reagent comprising a water-immiscible organic solvent having dissolved therein a 2-hydroxy benzophenoxime having a solubility of at least 2% by weight in the organic solvent and an organophosphoric acid having the formula:

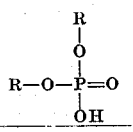

wherein R is selected from the group consisting of hydrogen, alkyl, aryl, and aralkyl and wherein not more than one R is hydrogen, to extract the copper values from the aqueous to the organic phase, separating said phases, and recovering the copper from the organic phase.

2. The process of claim 1 in which the 2-hydroxy benzophenoxime is a member selected from the group consisting of alkyl substituted, ethylenically unsaturated aliphatic substituted and alkyl or ethylenically unsaturated aliphatic ether substituted 2-hydroxy benzophenoximes.

3. The process of claim 2 in which the 2-hydroxy benzophenoxime has the formula:

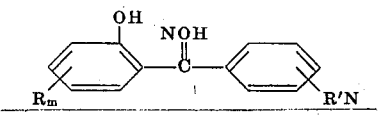

in which R and R' may be individually alike or different and are saturated aliphatic groups of 1–25 carbon atoms, ethylenically unsaturated aliphatic groups of 3–25 carbon atoms or —OR'' where R'' is a saturated or ethylenically unsaturated aliphatic group as defined, $m$ and $n$ are 0, 1, 2, 3 or 4 with the proviso that both are not 0 and the total number of carbon atoms in $R_m$ and $R'_m$ is from 3–25.

4. The process of claim 3 in which R of the 2-hydroxy benzophenoxime is an ethylenically unsaturated group.

5. The process of claim 3 in which R' of the 2-hydroxy benzophenoxime is an unsubstituted branched chain aliphatic hydrocarbon group.

6. The process of claim 3 in which R of the 2-hydroxy benzophenoxime is an unsubstituted branched chain hydrocarbon group.

7. The process of claim 3 in which at least one R group of the 2-hydroxy benzophenoxime is in the 5 position.

8. The process of claim 1 in which the 2-hydroxy benzophenoxime is present in an amount up to about 20 percent by volume of the solvent.

9. The process of claim 1 in which the organophosphoric acid is present in an amount of about 1 percent by volume of the solvent.

10. The process of claim 1 in which the organophosphoric acid is di-2-ethylhexyl phosphoric acid.

11. The process of claim 1 in which the organophosphoric acid is di-decyl phosphoric acid.

12. The process of claim 1 in which the organophosphoric acid is isoamyl phosphoric acid.

13. The process of claim 1 in which the organophosphoric acid is amyl phosphoric acid.

* * * * *